United States Patent

[11] 3,599,990

| [72] | Inventors | Harold Frederic Greiner;<br>Walter William Meyer, both of Warwick, R.I. |
|---|---|---|
| [21] | Appl. No. | 865,623 |
| [22] | Filed | Oct. 13, 1969<br>Division of Ser. No. 688,140, Dec. 5, 1967, Pat. No. 3,529,839. |
| [45] | Patented | Aug. 17, 1971 |
| [73] | Assignee | Sealol, Inc.<br>Warwick, R.I. |

[54] SHAFT SEAL
2 Claims, 16 Drawing Figs.

| [52] | U.S. Cl. | 277/4, 277/81 S, 277/86 |
|---|---|---|
| [51] | Int. Cl. | F16j 15/54, B63n 1/00 |
| [50] | Field of Search | 277/4, 91, 85—87, 81 S, 81 |

[56] References Cited

UNITED STATES PATENTS

| 2,828,983 | 4/1958 | Hunt | 277/81 S |
| 2,979,348 | 4/1961 | Rosniansky | 277/81 X |
| 3,025,070 | 3/1962 | Copes | 277/81 UX |
| 3,190,704 | 6/1965 | Guthans | 277/86 X |

FOREIGN PATENTS

| 1,043,184 | 9/1966 | Great Britain | 277/81 |

*Primary Examiner*—Samuel B. Rothberg
*Attorney*—William Frederick Werner

ABSTRACT: This invention relates to split-type face seals for use with oil-lubricated surface vessel stern tube bearings.

The present invention relates to mechanical rotary-type fluid seals and more particularly to an interface-type rotary fluid seal having a rotating mating ring and a stationary sealing thrust ring for use with oceangoing surface vessels.

3,599,990
PATENTED AUG 17 1971
SHEET 1 OF 3
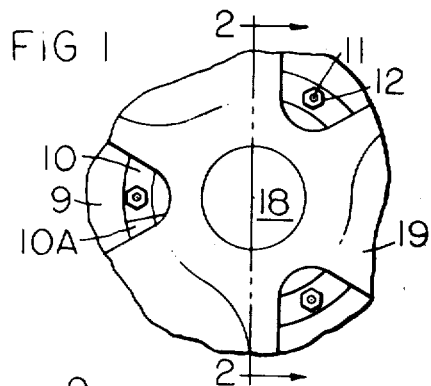
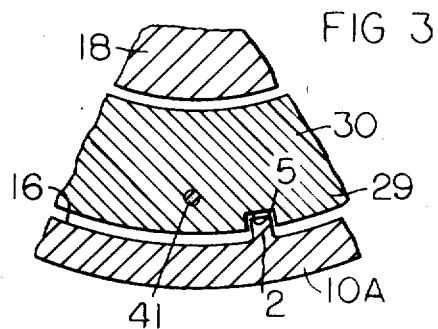
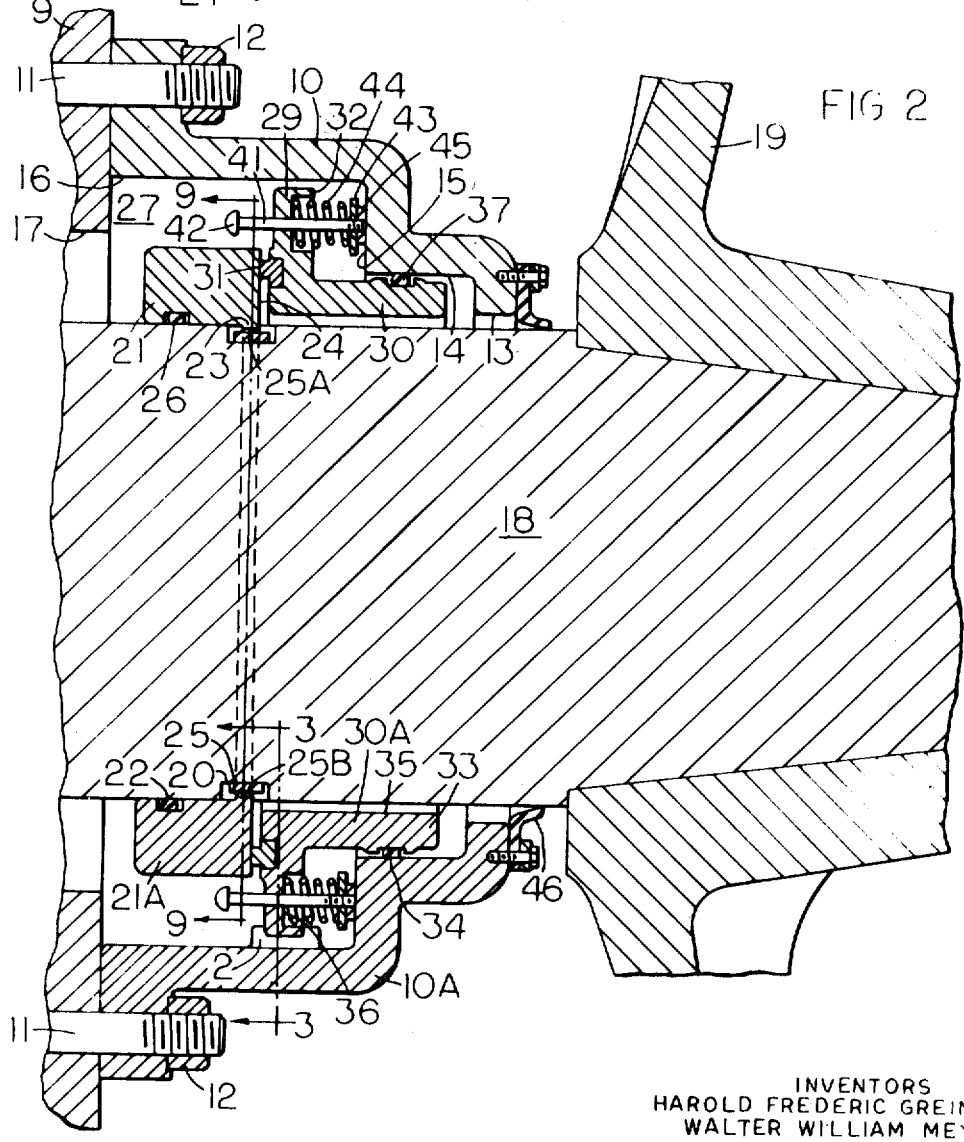
INVENTORS
HAROLD FREDERIC GREINER
WALTER WILLIAM MEYER
*William Frederick Werner*
ATTORNEY

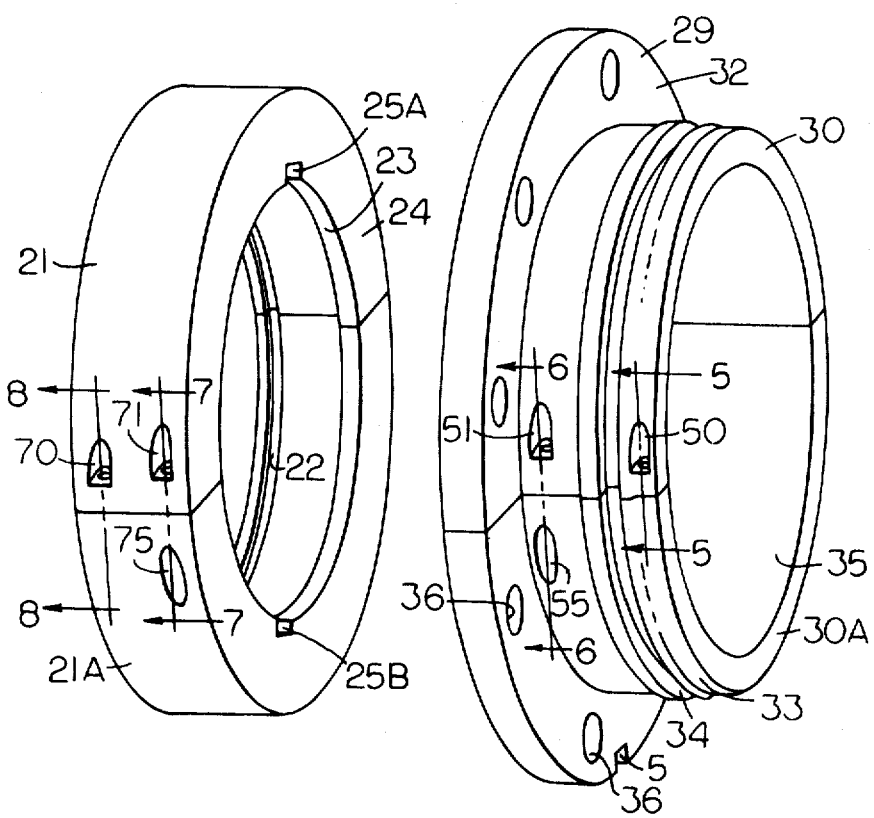
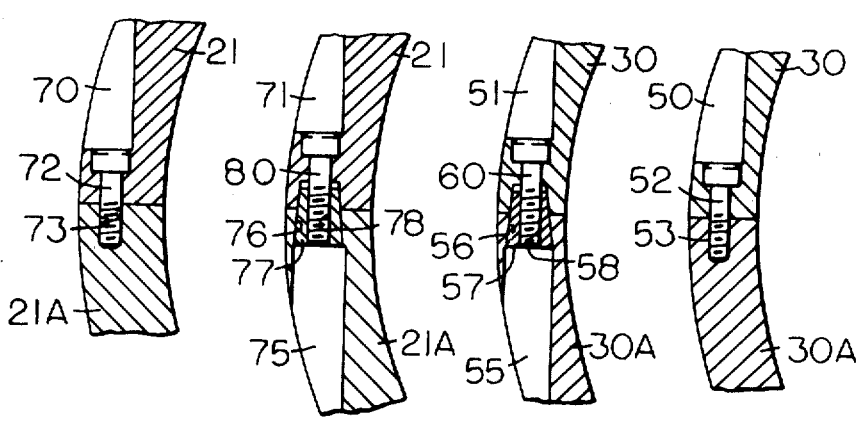

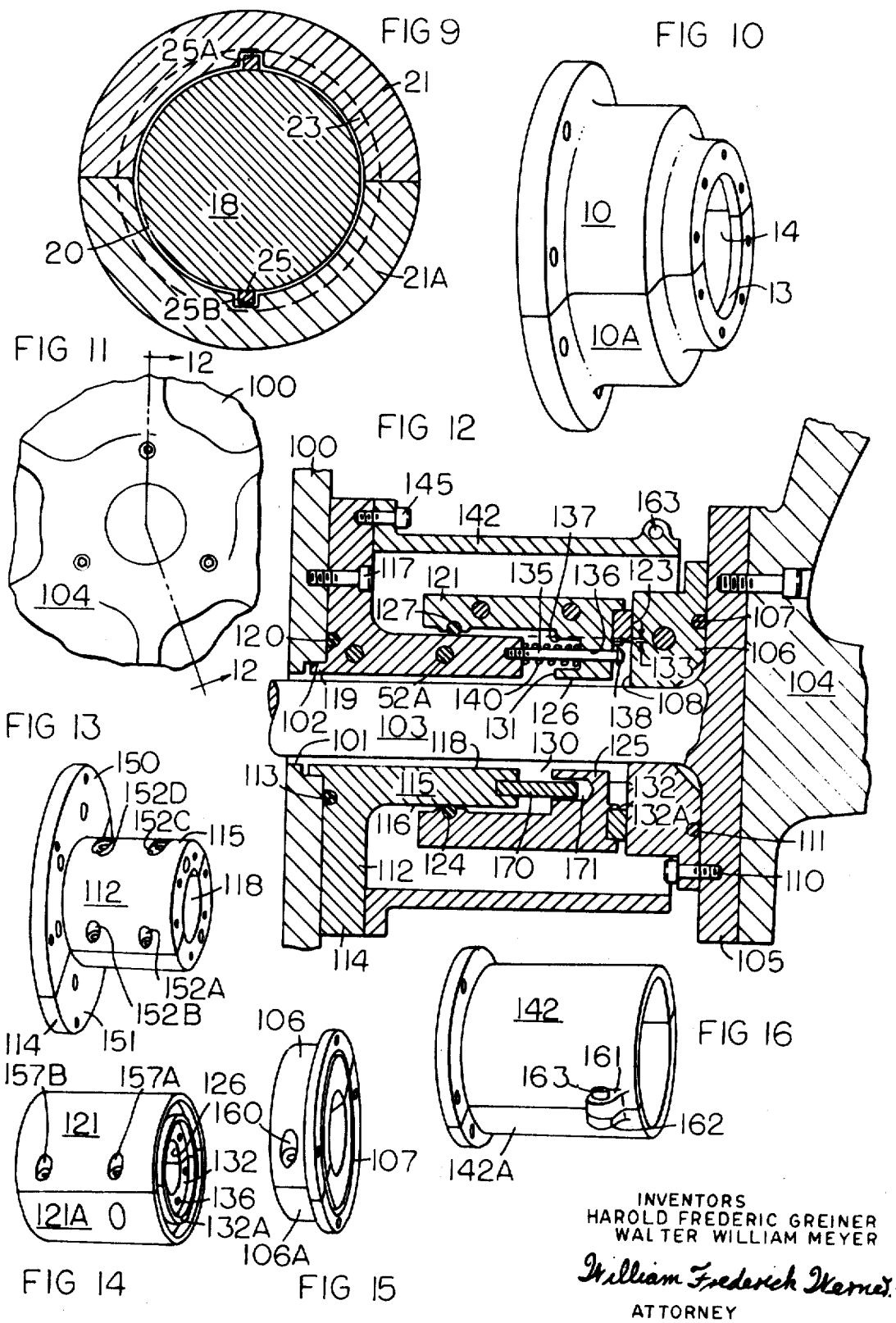

SHAFT SEAL

This application is a division of Pat. application Ser. No. 688,140, filed Dec. 5, 1967 by Harold Frederic Greiner and Walter William Meyer for a Shaft Seal now U.S. Pat. No. 3,529,839.

An object of the present invention is to provide a fluid seal on a propeller shaft which will seal out sea water and seal in bearing lubricating oil having a pressure greater than the pressure of the sea water.

In the past it was common practice to provide a flexible lip seal which surrounded and rubbed the propeller shaft to seal out sea water. The rubbing action wore the propeller shaft. A replaceable sleeve was then attached to the shaft so that the lip seal wore the sleeve. In either event it was necessary to frequently drydock the ship and replace the propeller shaft or remove the propeller so as to replace the sleeve. These are costly procedures. It is therefore an object of the present invention to provide a split seal which can readily be removed from the propeller shaft and be quickly repaired and replaced without the necessity of removing the propeller or the shaft.

With the advent of increased rotational speeds for propeller shafts of oceangoing ships, it becomes necessary to provide a better type of lubrication for the propeller shaft bearings than heretofore, was necessary for slower rotating shafts.

The present fluid seal provides an additional safety factor for keeping sea water from entering the ship's hull via, the propeller shaft, by providing lubricating oil with a pressure higher than the sea water pressure at the sealing interfaces, so that, sealing failure at the interfaces allows lubricating oil to escape into the sea rather than to allow sea water to enter the hull.

A shaft seal for a ship must be flexible enough to accommodate the whip inherent in such a shaft. The present invention provides a flexible construction through the use of an "O" ring seal, thereby, permitting the shaft to ship and the interfaces to accommodate themselves in perfect sealing engagement through automatic axial and angular adjustment of a sealing element.

Other objects of the present invention will become apparent in part and be pointed out in part in the following specification and claims.

Referring to the drawings in which similar characters of reference refer to like parts:

FIG. 1 is a fragmentary end view of a propeller attached to a propeller shaft.

FIG. 2 is a vertical cross-sectional view taken along line 2-2 of FIG. 1.

FIG. 3 is a fragmentary cross-sectional view taken on line 3-3 of FIG. 2.

FIG. 4 is an exploded perspective view of the new shaft seal.

FIG. 5 is a fragmentary cross-sectional view, taken on line 5-5 of FIG. 4.

FIG. 6 is a fragmentary cross-sectional view, taken on line 6-6 of FIG. 4.

FIG. 7 is a fragmentary cross-sectional view, taken on line 7-7 of FIG. 4.

FIG. 8 is a fragmentary cross-sectional view, taken on line 8-8 of FIG. 4.

FIG. 9 is a vertical cross-sectional view taken on line 9-9 of FIG. 2.

FIG. 10 is a perspective view of the housing shown in FIG. 2.

FIG. 11 is a fragmentary end view of a propeller attached to a propeller shaft in a manner different from FIG. 1.

FIG. 12 is a vertical cross-sectional view taken along line 12-12 of FIG. 11, constituting the modified form.

FIG. 13 is a perspective view of the adapter, shown in FIG. 12.

FIG. 14 is a perspective view of the sealing thrust ring, shown in FIG. 12.

FIG. 15 is a perspective view of the rotating mating ring, shown in FIG. 12.

FIG. 16 is a perspective view of rope guard, shown in FIG. 12.

In proceeding with this invention there is provided a split housing comprising sections 10, 10A which are fastened to the hull 9 of a ship by means of bolts 11 and nuts 12. The split housing, sections 10, 10A, when fastened together, in a manner presently to be described, have a contour so as to provide an axial bore 13, a sliding surface 14, a vertical wall 15 and a chamber wall 16.

Hull 9 is provided with an axial passageway 17. A shaft 18 projects from the inner portion of the hull 9, through axial passageway 17 and beyond housing sections 10, 10A so as to provide an area to which a propeller 19 may be attached. Shaft 18 is provided with a circular keyway 20.

A mating ring 21 provided with an "O" ring groove 22, a circular projection 23, two keyways, 25A, 25B and a mating face 24 is fastened to shaft 18 by means of a key 25 located in keyways 25A, 25B. An "O" ring 26 is located in "O" ring groove 22 and circumferentially grips the outside surface of shaft 18, thereby, to provide a fluidtight seal. Mating ring 21 consists of two half sections 21, 21A.

Housing sections 10, 10A when fastened to hull 9, with shaft 18 in operating position, provide a lubricating oil chamber 27. The oil will flow from inside the hull 9, through axial passageway 17, and into chamber 27. The oil will have a pressure of approximately 15 pounds per square inch of a pressure greater than the pressure of the sea water surrounding housing 10, 10A.

A sealing thrust ring 30 if provided with a rim 29 having a sealing face 31 and a circular pressure face 32. Sealing ring 30 is also provided with a horizontal projection 33 having an "O" ring groove 34 and an axial bore 35. Rim 29 is provided with a plurality of spring cups 36. Sealing face 31 is shown as an insert into rim 29. It is within the scope of the present invention to have sealing face 31 an integral part of rim 29.

Sealing thrust ring 30 through axial bore 35 surrounds shaft 18 with sealing face 31 engaging mating face 24. An "O" ring 37 is located in "O" ring groove 34 and engages sliding surface 14 in rocking axial sliding and fluid-sealing relationship.

Sealing face 31 and mating face 24 are known as the interfaces, because they engage in fluidtight relationship. One face is nonrotating. The other face rotates relative to it. In FIG. 2 the mating ring 21 and mating face 24 rotate. Sealing ring 30 and sealing face 31 are nonrotating.

Reference is made to FIG. 3 where it is shown that a projection or key 2 integrally formed on housing section 10A engages a keyway 5 formed in sealing ring 30 to prevent sealing ring 30 from rotating.

Fluid under pressure in chamber 27 will act upon circular pressure face 32 to axially slide sealing thrust ring 30 and therefore, sealing face 31 into engagement with mating face 24 to provide a fluidtight seal at the interfaces, however, the fluid under pressure acting upon the opposite face 40 of rim 29 will counterbalance the interface mating force. To insure that some pressure is at all time upon the interfaces, there are provided a plurality of spring guide pins 41 slidably mounted in rim 29 of sealing thrust ring 30, and axially centered in relation to spring cups 36. Spring guide pins 41 are provided on one end with enlarged heads 42. On the other end washers 43 are fastened as by means of nuts 45 threaded thereon. Coil springs 44 are interposed between washers 43 and the base of spring cups 36. In this manner, sealing thrust ring 30 is yieldingly urged toward mating ring 21 as the nuts 45 engage vertical wall 15 and the coil springs 44 act upon the sealing thrust ring 30.

A dirt guard 46 of flexible material may be fastened to housing 10, 10A so as to have lip engagement with shaft 18. In this manner particles of dirt are excluded from passing along shaft 18 toward the interfaces.

It will be observed, that housing 10, 10A and mating ring 21 and sealing ring 30 are located between hull 9 and propeller 19. Should it become necessary to replace the interfaces due to damage or wear; it is not necessary to remove propeller 19 from shaft 18 because of the split construction of the present shaft seal.

Reference is now made to FIGS. 4 thru 8. It will be observed that the sections 30, 30A forming the sealing thrust ring are equal halves of a complete circle. Section 30 is provided with two bored holes 50 and 51. Section 30 at bored hole 50 is drilled to accommodate the head and body of a screw 52. Section 30A is provided with a tapped hole 53 to accommodate the threads of screw 52.

FIGS. 5 thru 8 show one side of sealing thrust ring sections 30, 30A and of mating ring 21, 21A. It is to be understood, that the geometric opposite side of sealing thrust ring sections 30, 30A and mating ring 21, 21A are identically constructed. Therefore, rotation of screws 52 draws and fastens sealing thrust ring sections 30, 30A together.

Section 30 at bored hole 51 is drilled to accommodate the head and body of a screw 60. Section 30A is provided with a bored hole 55 and a tapered orifice 56 which extends into section 30 and is aligned with bored hole 51. A tapered plug 57 having a screw thread 58 is slidably mounted in tapered orifice 56.

Rotation of screw 60 draws tapered plug 57 in tapered orifice 56 toward section 30 and thereby aligns and fastens housing sections 30, 30A together.

In like manner, section 21, is provided with two bored holes 70, 71. Section 21 at bored hole 70 is drilled to accommodate the head and body of a screw 72. Section 21A is provided with a tapped hole 73 to accommodate the threads of screw 72. Rotation of screws 72 draws and fastens sections 21, 21A together.

Section 21 at bored hole 71 is drilled to accommodate the head and body of a screw 80. Section 21A is provided with a bored hole 75 and a tapered orifice 76 which extends into section 21 and is aligned with bored hole 71. A tapered plug 77 having a screw thread 78 is slidably mounted in tapered orifice 76. Rotation of screw 80 draws tapered plug 77 into tapered orifice 76 toward section 21 and thereby aligns and fastens housing sections 21, 21A together.

Reference is now made to FIGS. 11 thru 16 which illustrate a modified form of construction. The hull 100 of a ship, is fragmentarily shown, and is provided with an axial passageway 101 which may be stepped, as at 102. A shaft 103 extends from inside the hull 100 of the ship outwardly, through axial passageway 101 and is provided with a propeller 104 having a flange 105. The flange 105 may be an integral part of the propeller or it may be an integral part of shaft 103. In either event, the fluid seal must be removable and replaceable between the flange 105 and hull 100 without disturbing the propeller or the shaft.

A mating ring 106 having an "O" ring groove 107 and a mating face 108 is fastened to flange 105 by means of a plurality of bolts 110. An "O" ring 111 is located in groove 107 to ovide a fluidtight seal.

A sealing ring adapter 112 having an "O" ring groove 113 and a plate 114 provided with a neck 115 having a sealing surface 116, is fastened to hull 100 by means of a plurality of bolts 117. Adapter 112 is also provided with an axial bore 118 and a lip 119 which engages step 102. An "O" ring 120 located in "O" ring groove 124. Sealing 121 is slidably mounted upon sealing surface 116 with a fluidtight seat at "O" ring 127 and with sealing face 123 engaging mating face 108. In this manner, a chamber 130 is provided to accommodate lubricating oil under pressure approximating 15 pounds per square inch. The oil flow from inside the hull, through axial passageway 101 and into chamber 130 where it is sealed off at "O" ring 127 and at the interfaces 123, 108.

Fluid under pressure acting upon first surface 131 forces sealing face 123 against mating face 108. Fluid under pressure acting upon second pressure surfaces 132, 132A tends to force sealing face 123 away from mating face 108. Dimension 133 illustrates that surface 131 may be greater in area than surfaces 132, 132A, thereby to provide an area upon which the fluid acts to produce a force urging sealing face 123 into engagement with mating face 108.

To insure that the interfaces 108, 123 engage at all times a plurality of spring guide pins 135 are fastened in neck 115 of adapter 112. Sealing thrust ring 121 is provided with a plurality of clearance orifices 136 and aligned spring cups 137, one for each spring guide pin 135. Spring guide pins 135 have enlarged heads 138 and coil springs 140 mounted thereon are interposed between neck 115 and the base of spring cups 137. In this manner, coil springs 140 urge sealing face 123 into engagement with mating face 108.

A rope guard 142 surrounds the sealing ring 121, the interfaces 108 123 and a portion of the mating ring 106 and is fastened to the adapter by means of bolts 145.

An antirotation pin 170 is fastened in the end of sealing ring adapter 112 and engages an orifice 171 provided in circular flange 125.

With particular reference to FIG. 13, the sealing ring adapter 112 is fabricated in a plurality of sections, illustrated as two equal half sections 150, 151. Section 150 is provided with four bored holes 152A, 152B, 152C and 152D. Section 150 at bored hole 152A is drilled to accommodate the head and body of a screw 52A in a manner and for the same reason as described with reference to FIG. 5; and bored hole 152B corresponds to bored hole 51 shown and described with reference to FIG. 6. Since the construction of the fastening means is identical with reference to FIG. 5 and bored holes 152A and 152C; and with reference to FIG. 6 and bored holes 152B and 152D, it appears pointless to repeat such construction in detail over again.

In like manner bored holes 157A and 157B, FIG. 14, correspond, respectively, to bored holes 50, 51 and the construction therein represented is identical.

The construction shown in FIG. 15, bored hole 160 is identical to the construction shown in FIG. 6, bored hole 51. It being understood that the two halves 106 and 106A constituting the mating ring are identically constructed on the side opposite to that shown in FIG. 15.

The two halves 121, 121A constituting the sealing thrust ring are also identically constructed on the side opposite to that shown in FIG. 14.

FIG. 16 illustrates the rope guard sections 142, 142A. Each section is provided with two ears. Ears 161 and 162 are visible in FIG. 16. The ears on the opposite side are identical but cannot be seen in FIG. 16. A screw 163 passes through a clearance orifice provided for that purpose in ear 161 and engages screw threads in ear 162, whereby, screw 163 and its companion on the side opposite fasten sections 142 and 142A together.

Having shown and described preferred embodiments of the present invention by way of example, it should be realized that structural changes could be made and other examples given without departing from either the spirit or scope of this invention.

What we claim is:

1. A shaft seal for a rotatable shaft provided with a flange consisting of a sealing thrust ring adapter comprising a plate having a neck provided with a sealing surface and formed in two half sections of a complete circle, means removably fastening said sections together comprising one half section having two bored holes located in opposite sides of one half section, each bored hole adapted to accommodate the head and body of a screw, the lower portion of each of said two bored holes being tapered, the other half section having two tapered orifices located in opposite sides thereof and aligned with the two bored holes, respectively, two tapered plugs, each plug having a screw thread, located, respectively, in said two tapered orifices and extending into the tapered portion of said two bored holes, and two screws located, respectively, one in each bored hole and rotatively mounted in the screw threads respectively, of said two tapered plugs, whereby rotation of said two screws aligns and fastens said two half sections together, said adapter surrounding said shaft, means fastening said adapter to the hull of a ship, a mating ring having a mating face, said mating ring formed in sections, means removably fastening said last-mentioned sections together around said shaft, means fastening said mating ring to said flange, a sealing thrust ring having a sealing face and circular flange, said sealing thrust ring formed in sections, means removably fastening said last-mentioned sections together around said shaft, means slidably mounting said sealing thrust ring upon said sealing surface in fluidtight relationship, with said sealing face engaging said mating face.

2. A shaft seal for a rotatable shaft, consisting of a housing formed in a plurality of sections, said housing surrounding said shaft, means removably fastening said sections together, means fastening said housing to the hull of a ship, said housing forming a chamber around said shaft, a mating ring having a mating face, said mating ring formed in two half sections of a complete circle, means removably fastening said mating ring two half sections in alignment together around and to said shaft and in said chamber comprising two bored holes located, respectively, in opposite sides of one half section, each bored hole adapted to accommodate the head and body of a screw, the lower portion of each of said two bored holes being tapered, the other half section having two tapered orifices located in opposite sides thereof and aligned with the two bored holes, respectively, two tapered plugs, each plug having a screw thread located, respectively, in said two tapered orifices and extending into the tapered portion of said two bored holes, and two screws located, respectively, one in each bored hole and rotatively mounted in the screw threads, respectively, of said two tapered plugs, whereby, rotation of said two screws aligns and fastens said two half sections together, a sealing thrust ring having a sealing face, said sealing thrust ring formed in a plurality of sections, taper plug and screw means removably fastening said last-mentioned plurality of sections in alignment together around said shaft and in said chamber, means slidably mounting said sealing thrust ring to said housing with said sealing face engaging said mating face in axial alignment to form fluid-sealing interfaces, to thereby separate said chamber into two sections, wherein, one of said two sections houses oil and the other section houses sea water, fluid-sealing means interposed between said sealing thrust ring and said housing, to prevent sea water from entering said oil section, said fluid-sealing means forming a flexible seal connection permitting axial and angular adjustment between said interfaces to provide fluid-sealing engagement of said interfaces resilient means located in the oil section of said housing and located external of said interfaces on an enlarged diameter for urging said interfaces into a fluid-sealing condition.